Figure 1:
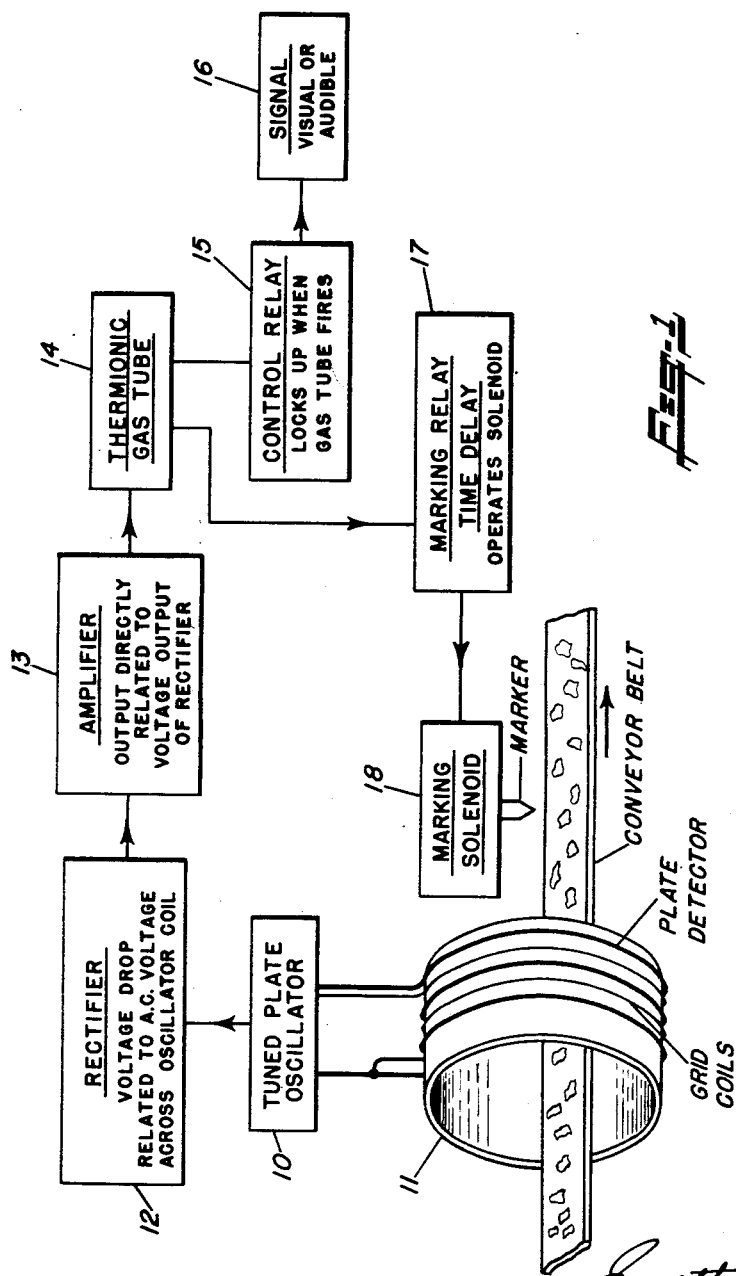

Jan. 1, 1952   E. A. GILBERT   2,580,670
METAL DETECTOR

Filed June 28, 1948   2 SHEETS—SHEET 1

INVENTOR
BY
ATTORNEY

Jan. 1, 1952  E. A. GILBERT  2,580,670
METAL DETECTOR
Filed June 28, 1948  2 SHEETS—SHEET 2

Everett A. Gilbert
Inventor

By Rudolph J. Jurick
ATTORNEY

Patented Jan. 1, 1952

2,580,670

UNITED STATES PATENT OFFICE 2,580,670

METAL DETECTOR

Everett A. Gilbert, Lake Hiawatha, N. J., assignor to Radio Frequency Laboratories, Inc., Boonton, N. J., a corporation of New Jersey Application June 28, 1948, Serial No. 35,699

12 Claims. (Cl. 175—183)

1

This invention relates to apparatus for detecting the presence of a moving body of metallic material.

The invention will be described hereinbelow with respect to the detection of metallic contaminant in a mass of mined ore as it proceeds to the crushing machinery but it will be understood the apparatus is not limited to this particular application.

In milling operations in which crushing machinery is employed to pulverize the ore, the ore is fed to the crusher on conveyor belts. It is not unusual for metallic bodies, such as broken parts of the mining or drilling machinery, to be present in the ore. If these bodies are permitted to enter the crushing machine with the ore serious damage may be caused.

Various forms of apparatus have been proposed for the detection of foreign metallic bodies present among non-metallic material. Certain of these are based upon the magnetic properties of the foreign body to be detected and are, therefore, inherently incapable of use for the detection of non-magnetic bodies.

Present metal detectors of the class designed for the detection of magnetic and non-magnetic bodies are of the type employing three wire wound coils. Two of the coils are wound in opposition and connected to a balanced impedance bridge, said coils being energized by the third coil in such manner that the first two coils are normally in exact electrical balance with one another. These prior arrangements are open to two serious objections from a practical viewpoint, namely, (1) the relative location of the three coils is extremely critical and a slight mechanical displacement of any coil unbalances the circuit and (2) the arrangement is critical to frequency changes which imposes an upper and lower limit of operating frequency.

The apparatus contemplated by this invention is not open to the above objections and comprises, broadly, two pick-up or detector coils connected to the grid and plate of a vacuum tube to form a tuned plate oscillator. These coils are placed around the conveyor belt and when a metal object (magnetic or non-magnetic) passes through the coils it adds a resistive component into the circuit whereby the magnitude of the oscillations decreases slightly. This voltage change causes operation of a thermionic gas tube which in turn places into operation a suitable signal device and a marking device which marks the conveyor belt at the location of the foreign body. The novel circuit and arrangement of components results in apparatus which is not subject to critical location of the detector coil, may be adjusted to detect large or small bodies and to distinguish between magnetic and non-magnetic bodies, and which functions to detect foreign bodies continuously even though numerous bodies pass by in close succession.

An object of this invention is the provision of metal detecting apparatus of simple construction and positive operation.

An object of this invention is the provision of electronic apparatus for the detection and identification of magnetic and non-magnetic metallic bodies present in a mass of non-metallic material when said material is in motion.

An object of this invention is the provision of a metal detector comprising a detector coil forming part of a vacuum tube oscillator circuit, means for detecting changes in the voltage oscillations across said coil occasioned by the passage of a metallic body through the coil, and control means operated by the first means for energizing a signal upon passage of a metallic body through the coil.

An object of this invention is the provision of apparatus comprising a pair of coils connected to a vacuum tube to form a tuned plate radio oscillator, a rectifier for rectifying the voltage oscillations across one of said coils, a thermionic gas tube controlled by the rectified voltage oscillations, and means controlled by the gas tube for indicating a change in the oscillation voltage across one of the coils whereby the apparatus is adapted to detect metallic bodies moved through the said coils.

An object of this invention is the provision of electronic apparatus for detecting and locating metallic bodies moving on a conveyor said apparatus comprising a pair of coils inductively coupled together and adapted to encircle the conveyor, a vacuum tube, circuit elements connecting the coils to the vacuum tube in the form of a tuned plate oscillator, a rectifier rectifying the output of the oscillator, means for detecting and amplifying changes in the rectified oscillator output, a thermionic gas tube normally biased below the firing point and adapted to fire upon changes in the oscillator output, a first control means operated upon firing of the gas tube to signal a change in the oscillator output, and a second control means operated upon firing of the gas tube to place a reference marking on the conveyor, whereby a metal particle moving through the coils will decrease the oscillation voltage causing the apparatus to signal the presence, and mark the location, of said metal particle.

These and other objects and advantages will become apparent from the following description when taken with the accompanying drawings which illustrate one embodiment of the invention, it being understood the description is not to be construed as restricting the scope of the invention beyond the terms of the claims appended hereto.

Figure 2:
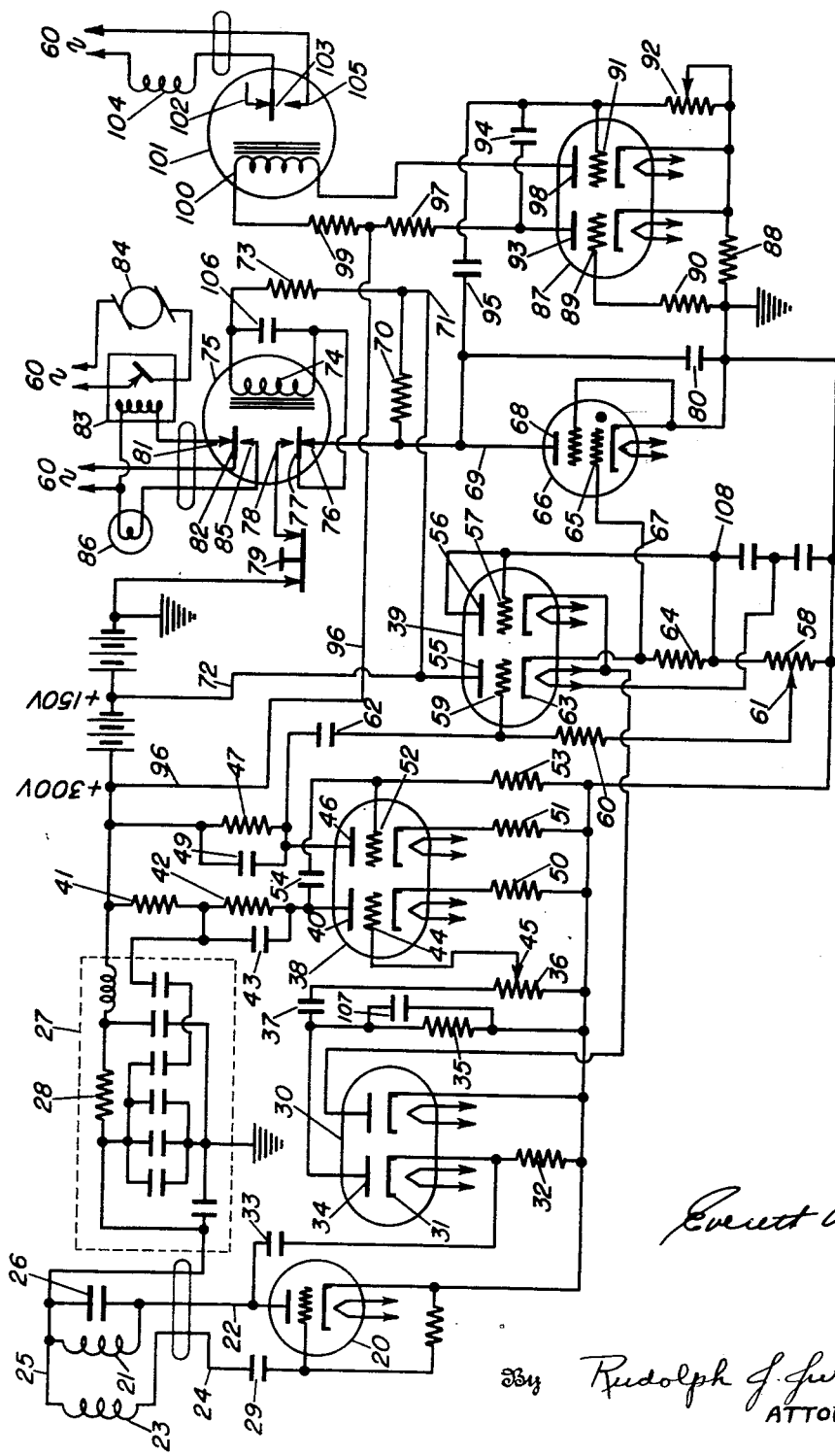

In the drawing wherein like reference characters identify like parts in the several views:

Figure 1 is a block diagram illustrating the relation of various components to provide apparatus in accordance with this invention; and Figure 2 is a circuit diagram of the metal detector apparatus.

Referring now to the block diagram of Figure 1, the grid and plate coils of the tuned oscillator 10 are wound in alternate turns upon a wooden coil frame 11, which frame is made sufficiently large to encircle the conveyor belt, as shown. In practice the oscillator coils may be tuned to a frequency ranging from 10 to 1000 k. c., the specific frequency being determined by results to be obtained from the particular apparatus, as will be explained in more detail hereinbelow.

When a metal object (magnetic or non-magnetic) passes through the plate coil it adds a resistive component into the circuit thereby decreasing slightly the magnitude of the voltage oscillations across the plate coil. A rectifier 12 rectifies the voltage oscillations across the plate coil and a resistor in the output side of the rectifier provides a D. C. voltage drop that is related directly to the A. C. voltage across the plate coil. The grid of an amplifier 13 is controlled by a change in the voltage drop appearing across an output resistor of the rectifier 12. Thus, any change in the voltage oscillations across the plate coil caused by a metal object moving therethrough results in a change of grid bias in the amplifier 13. The circuit is so arranged that the momentary change in the grid bias results in an amplified pulse of current on the output side of the amplifier.

A thermionic gas tube 14, such as a Thyratron, is normally biased below the firing point. The amplified pulse output of the amplifier 13 causes the tube 14 to fire thereby energizing the control relay 15 which locks in electrically. A suitable set of contacts on the relay 15 close an electrical circuit to operate a signal 16 and/or a suitable mechanism to stop the motion of the conveyor belt, if so desired.

The thermionic gas tube 14 also operates a marking relay 17 which in turn causes energization of a marking solenoid 18, the latter including suitable means for applying a distinguishing mark to the conveyor belt. The relay 17 includes time delay means adjustable with respect to the linear speed of the conveyor belt so that the mark applied to the belt will identify the precise location of the metal object which caused operation of the apparatus.

My apparatus includes novel features which result in a simple, positive and practical metal detector. These features will be pointed out with respect to the detailed description of the complete circuit diagram.

Referring now to the circuit diagram shown in Figure 2, the energy for the oscillator circuit is provided by a vacuum tube 20 such as a type 6J5. The plate coil 21 is connected to the plate of the tube by the wire 22 and the grid coil 23 is connected to the grid by the wire 24. The other ends of the coils are connected together by the wire 25. Coil 21 is tuned to a pre-chosen frequency by means of the parallel connected condenser 26.

As stated above, the particular frequency to which a given apparatus is adjusted is determined by the specific application for which the apparatus is designed. A piece of iron passing through the plate coil 21 will reflect more loss in the coil at say 10 k. c. due to hysteresis than will an equal size piece of copper. Thus, apparatus designed to detect magnetic bodies will be adjusted to operate at a relatively low frequency of 10–50 k. c. On the other hand a piece of copper will reflect more loss at 1000 k. c. than an equal size piece of iron due to the lower resistance of copper at the higher frequencies. Thus, apparatus designed to detect non-magnetic materials will be adjusted to a relatively high frequency, say 1000 k. c. Therefore, by tuning the plate coil to a predetermined frequency the circuit of this invention can be used to distinguish between various non-magnetic metals by measuring their relative resistivities, and between magnetic and non-magnetic metals depending upon the combination of resistivity and hysteresis losses.

When the apparatus is designed for detecting metal bodies moving in a mass of mined ore the operating frequency is set to approximately 26 k. c.; the plate coil comprises 37 turns of No. 12 wire; and the grid coil comprises 7 turns of No. 20 wire.

In conventional oscillator design the mutual inductance between the grid and plate coils is made large to provide stability with respect to voltage output. In the present invention the converse is true, that is, I obtain the maximum change, or controlled instability, of voltage output from a regenerative circuit due to a change in the losses or "Q" of a tank coil. The plate coil 21 is made of heavy wire and comprises 37 turns with adjacent turns on the coil form 11, Figure 1, well spaced from each other. This coil has a high "Q" or ratio between its inductance and resistance. The grid coil 23 is made of small diameter wire comprising 7 turns and is wound in alternate turns with the plate coil on the coil form. The mutual inductance between the grid and plate coils is small and provides just enough regenerative coupling back to the grid to cause oscillation.

The electrodes of the oscillator tube 20 are energized in the conventional manner, the D. C. potential to the plate being +300 volts. Inserted between the 300 volt source and the plate is a conventional filter circuit 27, shown within the dotted lines on the drawing, and the resistor 28 serves to protect the tube 20 from damage due to overvoltage in the event the circuit accidentally is topped from oscillating. Condenser 29 bypasses the grid voltage to the grid coil.

The voltage oscillations across the plate coil 21 are rectified by the first section of the rectifier tube 30. The cathode 31 of this section is normally biased by the dropping resistor 32 and the by-pass condenser 33 prevents passage of the D. C. plate current of the oscillator tube 20 to the rectifier tube 30. A fixed load on the anode 34 of the tube 30 comprises the resistor 35 and the filtering condenser 107 which by-passes the oscillator frequency voltage to ground. A second load resistor 36 is connected in parallel with the load resistor 35 through the coupling condenser 37.

It will be apparent the oscillator tube 20 provides the energy to the oscillator coils and the oscillator circuit will automatically adjust itself to hold the plate coil 21 and the condenser 26 in resonance. At resonance the plate coil 21 and the condenser 26 will appear as a pure resistance $Z_o$ of a value Q W L ohms, where $W = 2\pi f$. The "Q" of the plate coil 21 is lowered by bringing metal into its field thereby lowering the resistance $Z_o$. The A. C. voltage on the plate of tube 20 divides proportionally across the internal plate resistance and $Z_o$. Therefore, starting under operating conditions of voltage with proper circuit constants and bringing metal into the field of coil 21, the following train of effects takes place. The value of $Z_o$ is lowered and the proportion of the A. C. plate voltage across coil 21 becomes less. This results in a transfer of less voltage to the grid coil 23 and so reduces the grid bias on the tube 20, allowing more plate current to flow. It is known the internal plate resistance of a tube decreases with increasing plate current flow. Consequently, the proportion of the A. C. plate voltage across $Z_o$ increases until a new stable condition of oscillation is established for the new "Q" of the coil with the metal in its field and at a reduced voltage across the coil 21. Thus, it will be seen, there is produced, in effect, a stabilizing decrease in the A. C. voltage drop across the internal plate circuit. The result is a controlled net decrease in the voltage on the cathode 31 of the rectifier tube 30 which is reflected in the output circuit of the tube 30 by a decrease in the I R drop across the load resistor 35. This voltage change varies between .01 volts and 30 volts depending upon the size of the metal body passing through the field of the plate coil 21.

A conventional low frequency amplifier is employed to amplify the change in voltage occasioned by a metal body brought into the field of the oscillator plate coil. The amplifier comprises the tubes 38 and 39 which may be of the type identified as 6SL7. Plate 40 of the tube 38 is connected to the 300 volt source through the decoupling resistor 41 and the load resistor 42, the latter being shunted by the condenser 43 to cut off the high frequency of the oscillator circuit. The grid 44 is biased with a negative voltage of a value that depends upon the setting of the slide wire contact 45 on the grid potentiometer 36. It will be apparent the gain of the amplifier may be varied by adjustment of the contact 45 on the resistor 36. In this manner the apparatus may be conditioned to detect metal particles of a desired, minimum size. The other plate 46 of the tube 38 is also connected to the 300 volt source through the plate resistor 47 provided with the shunting condenser 49. Both cathodes of the tube are biased by means of the respective resistors 50, 51. The grid 52 is biased by means of the grid resistor 53 and is tied to the plate 40 through the coupling condenser 54.

The second amplifier tube 39 has the one plate 55 connected to a 150 volt source while the other plate 56 is connected to the grid 57 and to the biasing resistor 58. A negative bias is applied to the grid 59 through the grid resistor 60 and the movable contact 61 on the biasing resistor 58, said grid 59 also being tied to the plate 46 of the tube 38 through a coupling condenser 62. It is pointed out the cathode 63 of the tube 39 is connected to the grid 57 and plate 56 of the tube through the resistor 64, and the amplifier section of the apparatus (tubes 38 and 39) remains inactive under normal conditions. The voltage on the grid 57 is normally −14 volts due to the voltage doubling rectifier action of the second half of the tube 30 and tube 39 on the filament voltage.

When the rectified output of the plate 34 of the rectifier tube 30 decreases momentarily due to a metal body passing through the field of the oscillator coil 21, there results a momentary decrease in the negative voltage across the gain control resistor 36 of the first amplifier tube 38. This momentary decrease in the bias of the grid 44 results in a momentary increase in the plate current flowing through the cooperating plate 40 thereby setting into motion a progressive amplification of the "pulse" through the successive plate-grid circuits of the tubes 38 and 39. The amplified pulse is reflected as a corresponding increase in the voltage drop appearing across the cathode resistor 64. Inasmuch as the grid 65 of the thermionic gas tube 66 is connected to the cathode resistor 64 by the wire 67, the negative grid bias of the gas tube will depend upon the negative potential (−14 volts) of the point 108 minus the voltage drop appearing across the cathode resistor 64. A decrease in the negative bias of the grid 65 to about −2 volts will cause the thermionic gas tube to fire.

The thermionic gas tube 66 has its anode 68 normally energized at +150 volts through the wire 69, high ohmage resistor 70 and the wires 71 and 72. With 150 volts on the anode the normal negative bias on the grid 65 is such that the tube does not fire. Connected in parallel across the resistor 70 is a network comprising a resistor 73, the coil 74 of the control relay 75 and the normally closed relay contacts 76, 77. When the gas tube 66 fires, due to a pulse passing through the amplifier tubes 38, 39, a D. C. current flows in the anode circuit. This current flows through two parallel circuits. One circuit includes the resistor 70. The other circuit includes the resistor 73 and the relay coil 74. Current flowing through the relay coil 74 causes the movable contact 77 to break away from the back contact 76 and close with the front contact 78. Once the contacts 77 and 78 close the relay coil is electrically locked in through the hand operated switch 79. The energy necessary to insure positive movement of the contact 77 (after it has left the contact 76 and broken the anode current to element 68 of the gas tube and before it has reached the back contact 78) is obtained by the discharge of the condenser 106 through the relay coil 74, as is well known in the art. At the same time, the relay coil 74 and its series resistor 73 have been cut out of the anode circuit with the result that the drop in the resistor 70 reduces the voltage on the anode 68 by approximately 140 volts. During this period when the anode voltage is about 10 volts, the pulse has passed through the amplifier and the negative bias on the grid 65 has increased to its normal value. Consequently, the tube again ceases firing. In the meantime (in about .02 seconds) the condenser 80 which is connected between the anode 68 and ground becomes charged to again bring the voltage on the anode 68 back to the original 150 volts. Thus, although the relay coil 74 remains locked up until the hand switch 79 is pressed to open the locking circuit, the gas tube 66 is ready to fire when another pulse comes through the amplifier tubes.

The second set of contacts on the relay 75 are employed for signalling and control purposes.

The contacts 81, 82 are normally closed, that is, in contact when the coil 74 is deenergized, thereby closing the 60 cycle power circuit through the coil of the power relay 83. When the power relay coil is energized the contacts close the power circuit to the motor 84 which drives the conveyor belt. When the control relay coil 74 is energized the contacts 81, 82 open thereby causing the contacts of the power relay to open and stop the motor. At the same time contacts 82 and 85 close energizing the signal light 86. Thus, it is now apparent that when the gas tube 66 fires, the relay 75 locks up, the signal light is energized and the conveyor belt will stop. After the attendant has located and removed the metal body from the conveyor belt he merely pushes the hand switch 79 causing the relay coil 74 to become deenergized whereupon the signal light goes out and the conveyor belt is again placed into motion.

In practice it is desirable to have a signal light flash on to call attention to the fact that a metal body has passed through the detector coils, but it is not necessary simultaneously to stop the movement of the conveyor belt. In such case the belt driving motor is connected directly to the power through a separate starter switch rather than being controlled through the relay 75, and the apparatus is designed to place a mark on the conveyor belt to designate the precise location of the foreign metallic body.

A multi-vibrator tube 87 has its cathodes biased by the resistor 88. The one grid 89 is biased by the grid resistor 90 and the other grid 91 is tied to the cathodes through the adjustable resistor 92 and to the plate 93 through the coupling condenser 94. The grid 91 is also connected to the anode 68 of the gas filled tube 66 through the coupling condenser 95. The plate 93 is energized at +300 volts through the wire 96 and load resistor 97, while the plate 98 is likewise energized through the resistor 99 and the coil 100 of relay 101. From this it will be seen that the amount of current flowing through the relay coil 100 depends upon the current flow in plate 98 which, in turn, depends upon the potential bias on the grid 91. The circuit constants are adjusted such that the relay coil 100 is fully energized when the apparatus is in normal condition; thus contacts 102 and 103 of relay 101 are normally closed and the marker solenoid 104 is deenergized.

When the thermionic gas tube 66 fires, the momentary pulse of approximately 100 volts occasioned by the firing of the tube, passes through the coupling condenser 95 and increases the negative potential bias on the grid 91 of the tube 87, thereby cutting off the plate current flow. This deenergizes the relay coil 100 causing relay contacts 103 and 105 to close thereby energizing the marker solenoid 104. The voltage on grid 91 returns to its original value when the condenser 94 discharges to ground through the resistors 92 and 88. Thus, if the solenoid 104 operates a plunger which impresses a chalk mark on the conveyor belt the length of the mark may be governed by the value of the condenser 94 and the adjustable resistor 92. By increasing the resistance of resistor 92 the coil 100 of the relay 101 will remain deenergized for a longer period resulting in a longer mark on the conveyor belt. It is apparent that in place of, or in addition to, a solenoid operated marking device the relay 101 may be provided with a second set of contacts to operate an automatic rejecting device.

Having now described the circuit in detail it is pointed out that a metal detector made in accordance with this invention provides a continuous check to call attention to undesired metal bodies passing through the detector coil. The apparatus normally remains in what may be termed a balanced or neutral state. The moment a metal body passes through the plate coil of the oscillator circuit there is a momentary decrease in the magnitude of the voltage oscillations of the tube 20 which is converted into a pulse of predetermined polarity by the rectifier tube 30. This pulse appears at the input to the amplifier tube 38 and results in a magnified voltage pulse in the output of the amplifier tube 39. This amplified pulse reduces the blocking grid bias on the gas tube 66 causing same to fire. Upon firing of the gas tube 66 the relay 75 becomes energized causing a transfer of the control contacts such that 1, the relay locks in electrically, 2, the signal 86 is energized and 3, the belt driving motor stops (optional). As the relay 75 operates the voltage on the anode of the gas tube 66 decreases such that after the passage of the initiating pulse the tube ceases firing. However, during the initial firing of the gas tube the plate current flow of the multi-vibrator tube 87 has ceased to flow thereby deenergizing the relay 101 causing operation of the marker solenoid 104. Although the relay 75 remains locked-in the gas tube is immediately conditioned to respond to a second pulse coming from the amplifier tube 39. Therefore, the marker solenoid will operate to place successive markings on the conveyor belt regardless of when the relay 75 is deenergized by opening of the hand switch 79.

Inasmuch as my apparatus operates on a tube characteristic which is based upon a small mutual inductance, or very loose coupling, between the plate and grid oscillator coils the apparatus is not critical to the exact location of the coils nor to frequency. Any accidental displacement of the coils with respect to each other merely results in an automatic change in the oscillator voltage output without significant loss of operating sensitivity.

The oscillator coils and the tuning condenser may be placed at any convenient point on the conveyor belt and the apparatus proper may be assembled in a single cabinet mounted on a nearby panel or rack. The signal light may also be positioned at a point from which it can be seen most conveniently by an attendant, being connected to the control cabinet by suitable wires. Likewise, the belt marking apparatus may be disposed at any point along the conveyor belt. As shown in Figure 2 and hereinabove described, the marking mechanism would have to be placed immediately adjacent to the pick-up coils 21, 23 as the time elapsing from the moment a metal body enters the field of the detector coil 21 to the actual operation of the marker solenoid is only a fraction of a second. This is generally desirable in order to afford sufficient time for the removal of the metal at a point which will reduce to a minimum the chance for such metal passing into the crushing machine through oversight. However, by inserting a conventional time delay mechanism between the control relay 101 and the solenoid 104, and adjusting such a mechanism with respect to the linear speed of the conveyor belt, the marking device may be placed any distance away from the detector coil.

While I have shown a battery as the D. C. power source for energizing the plate circuits of the various tubes it will be understood the commercial form of the invention will include a conventional, regulated power pack to supply all necessary voltages for the proper energization and operation of the various components.

Having now described my invention in detail various changes in the individual components and in the arrangement of the coacting parts will become apparent to those skilled in the electronic art. Changes of this character which fall within the scope and spirit of the invention are intended to be covered by the following claims.

I claim:

1. Apparatus for detecting metal bodies in motion and comprising an oscillator having a tuned plate coil magnetically coupled to an untuned grid coil wherein the magnitude of the A. C. voltage across the plate coil changes in proportion to the eddy current losses of a metal body brought into the field of the plate coil; means rectifying the voltage change across the plate coil to produce a unidirectional voltage pulse; means amplifying the unidirectional voltage pulse; normally inactive control means adapted to become activated in response to the amplified voltage pulse; signal means energized in response to the initial activation of said control means; and means effective automatically upon operation of the signal means to cause said control means to again become inactive.

2. The invention as recited in claim 1 and including means effective to maintain the signal means energized after the control means returns to the inactive state.

3. A metal detector comprising an oscillator circuit having a tuned plate coil magnetically coupled to an untuned grid coil wherein the magnitude of the voltage oscillations across the plate coil change in proportion to the energy losses in the oscillator circuit occasioned by a metal body brought into the field of the plate coil; means rectifying the voltage oscillations across said plate coil; an electronic amplifier; circuit elements for impressing momentary changes in the voltage output of said rectifying means upon the input circuit of the amplifier; a thermionic gas tube having a grid normally biased to prevent firing of said gas tube; circuit elements connecting the grid of the gas tube to the amplifier output circuit, whereby a momentary voltage change in the amplifier input circuit causes the gas tube to fire; a signal; a control relay connected in the anode circuit of the gas tube, said control relay effective to cause energization of the said signal when the gas tube fires; and means including the coil of the control relay for restricting the firing cycle of the gas tube to less than one second.

4. Metal detecting apparatus comprising the combination of a detector coil forming part of a tuned plate oscillator circuit; a rectifier tube having a load resistor connected to the plate; circuit elements connecting the cathode of the rectifier tube to the oscillator circuit whereby the voltage drop across said load resistor is related to the voltage across the said detector coil; a low frequency amplifier having an input grid biased by the voltage drop across the load resistor of the rectifier tube; a thermionic gas tube having a grid normally biased to prevent firing of the gas tube; circuit elements for impressing the output voltage of the amplifier upon the grid of the gas tube whereby a momentary change in the input circuit of the amplifier causes the gas tube to fire; a control relay having an operating coil normally connected to the anode of the gas tube, said operating coil becoming energized when the gas tube fires; a set of relay contacts effective upon energization of the operating coil to transfer the operating coil from the anode of the gas tube to an auxiliary circuit whereby the operating coil will remain locked-in electrically; a signal energized during the period when the operating coil of the relay is energized; and means effective to cause said gas tube to cease firing when the said operating coil of the relay is disconnected from the anode of said gas tube.

5. A metal detector comprising a detector coil forming part of an electronic oscillator circuit; means rectifying the A. C. voltage appearing across said detector coil; an electronic amplifier; circuit elements for impressing changes in the voltage output of said rectifying means upon the input circuit of the amplifier; a thermionic gas tube having a grid connected to the output circuit of the amplifier said grid normally biased to prevent firing of the gas tube; a first control relay connected in the anode circuit of the gas tube said relay being energized when the gas tube fires; contacts carried by the first control relay and adapted to energize a signal when the gas tube fires; a multi-vibrator tube having a control grid connected to the anode of the gas tube such that the flow of plate current in the multi-vibrator tube is cut-off during periods when the gas tube is firing; a second control relay connected in the plate circuit of the multi-vibrator tube; a marking device; and a set of contacts on the second control relay said contacts adapted to cause energization of the marking device during periods when the second control relay is de-energized.

6. The invention as recited in claim 5 including means adapted to cause the gas tube to cease firing immediately after the first control relay is energized.

7. The invention as recited in claim 6, wherein the means adapted to cause the gas tube to cease firing includes a high ohmage resistor connected between the anode of the gas tube and the voltage source for energizing the said anode.

8. The invention as recited in claim 5, and including means effective to reestablish the flow of plate current in the multi-vibrator tube after the gas tube has ceased firing.

9. Apparatus for the detection of metal bodies in motion said apparatus comprising an electronic oscillator tube; a detector coil connected to the plate of the oscillator tube; a grid coil connected to the grid of the oscillator tube and loosely coupled to the said detector coil; a rectifier tube having a cathode connected to the detector coil; a load resistor in the plate circuit of the rectifier tube; a low frequency amplifier having the input grid connected to the load resistor of the rectifier tube; a thermionic gas tube having a grid normally biased to prevent firing of the tube; circuit elements connecting the grid of the gas tube to the output circuit of the rectifier whereby a voltage pulse passing through the amplifier will cause said gas tube to fire; a relatively high ohmage resistor connected between the anode of the gas tube and a source of D. C. potential; a control relay having the operating coil connected across the said high ohmage resistor through a pair of normally closed contacts said operating coil being energized when the gas tube fires; a transfer contact on the control relay and adapted to transfer the relay operating coil from the anode of the gas tube to a holding circuit whereby the relay will remain locked-in once the operating coil has been energized; hand operable means for opening the holding circuit to cause said relay to return to normal condition; a multi-vibrator tube having a control grid connected to the anode of the gas tube through a capacitor; a marker relay having an operating coil connected in the plate circuit of the multi-vibrator tube, said operating coil being energized when current flows through the plate of the multi-vibrator tube; a solenoid-operated marking device; and a set of contacts carried by the marking relay and adapted to cause energization of the solenoid-operated marking device when the operating coil of the marker relay is deenergized; whereby a metal body passing into the field of the detector coil causes an initial firing of the gas tube which in turn causes simultaneous operation of the control and marker relays and subsequent metal bodies passing into the field of the detector coil result only in the operation of the marker relay until such time as the control relay is reset by the hand operable means.

10. The invention as recited in claim 9, and including a capacitor connected in parallel with the operating coil of the control relay.

11. The invention as recited in claim 9, and including circuit elements adapted to reestablish current flow in the plate circuit of the multi-vibrator tube during the period when the gas tube is not firing.

12. The invention as recited in claim 9, wherein the control relay carries a second set of contacts adapted to energize a signal during periods when the operating coil of the said control relay is energized.

EVERETT A. GILBERT.

REFERENCES CITED

The following references are of record in the file of this patent:

UNITED STATES PATENTS

| Number | Name | Date |
| --- | --- | --- |
| 1,640,524 | Augustine | Aug. 30, 1927 |
| 1,901,663 | Minkler | Mar. 14, 1933 |
| 1,943,619 | Mudge et al. | Jan. 16, 1934 |
| 1,996,906 | De Lanty | Apr. 9, 1935 |
| 2,005,011 | Specht | June 18, 1935 |
| 2,055,672 | Roop | Sept. 29, 1936 |
| 2,326,344 | Elmendorf | Aug. 10, 1943 |

FOREIGN PATENTS

| Number | Country | Date |
| --- | --- | --- |
| 367,928 | Great Britain | Mar. 3, 1932 |